United States Patent [19]

Kuo

[11] Patent Number: 4,817,901

[45] Date of Patent: Apr. 4, 1989

[54] ADJUSTABLE SECUREMENT RING

[76] Inventor: Jen M. Kuo, No. 26-5, Hsin Ten Village, Jen Te Hsiang, Tainan Hsien, Taiwan

[21] Appl. No.: 203,500

[22] Filed: Jun. 7, 1988

[51] Int. Cl.$^4$ .............................................. F16B 2/08
[52] U.S. Cl. .................................... 248/231; 248/201; 248/74.3; 24/16 PB; 24/17 AP; 24/30.5 L
[58] Field of Search ...................... 248/231, 201, 223.4, 248/218.4, 74.3, 230, 219.1, 311.2, 313; 24/16 R, 16 PB, 17 AP, 30.5 P, 30.5 R, 30.5 L, 115 H, 136 R

[56] References Cited

U.S. PATENT DOCUMENTS

| 519,312 | 5/1894 | Arthur | 248/231 |
| 1,871,240 | 8/1932 | Scheller | 248/230 X |
| 4,653,155 | 3/1987 | Hara | 248/74.3 X |

FOREIGN PATENT DOCUMENTS

| 2139091 | 3/1972 | Fed. Rep. of Germany | 24/16 PB |
| 555839 | 9/1957 | Netherlands | 248/201 |
| 9814 | of 1909 | United Kingdom | 248/230 |
| 756930 | 9/1956 | United Kingdom | 248/201 |

Primary Examiner—Ramon S. Britts
Assistant Examiner—Karen J. Chotkowski
Attorney, Agent, or Firm—Poms, Smith, Lande & Rose

[57] ABSTRACT

An adjustable securement ring to secure a bicycle pump on a bicycle having a securing element and a retarding element. The securing element has a retaining body which has a cone-shaped protrusion for sustaining a distal end of the pump. An elongate strip protrudes from the bottom end of the retaining body and make a loop to go back through a channel provided on the lower portion of the retaining body. A plurality of protuberances are provided on the outer surface of the elongate strip along its length. The retarding element has upper and lower plates which are connected to each other by a connector. A tenon provided on the lower surface of the upper plate prevents the escape of the retarding element from the retaining body and lugs provided on the lower surface of the lower plate to retain the protuberances in the channel when the retarding element lodges in the securing element.

3 Claims, 4 Drawing Sheets

ADJUSTABLE SECUREMENT RING

BACKGROUND OF THE INVENTION

The present invention relates to an adjustable securement ring, and more particularly relates to adjustable securement rings which are employed to secure a bicycle pump on a bicycle.

In order to be able to repair of flat tire, it is preferable to carry a pump on a bicycle. Heretofore, many apparatuses have been developed to facilitate the mounting of a pump on a bicycle; for example, a conventional securement element 6, as shown in FIG. 5, is formed in a ring shape with a screw 61 penetrating through both distal ends 62 thereof. It is obvious that such a securement element 6 cannot be employed when the radius of a tube to be mounted on is smaller than the radius surrounded by the securement element 6; moreover, there is no means to prevent this securement element 6 from sliding when mounted on a tube.

This application has arisen from work in seeking to obviate and/or mitigate the above-mentioned problems.

SUMMARY OF THE INVENTION

A primary objective of the present invention is to provide adjustable securement rings which are available to secure a pump on tubes of various dimensions.

Another objective of the present invention is to provide an adjustable securement ring which can exactly secure a pump on a tube and prevent the pump from slipping away while riding on a bumpy road.

Still another objective of the present invention is to provide an adjustable securement ring which is easily mounted on a tube and is adjustable thereon.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
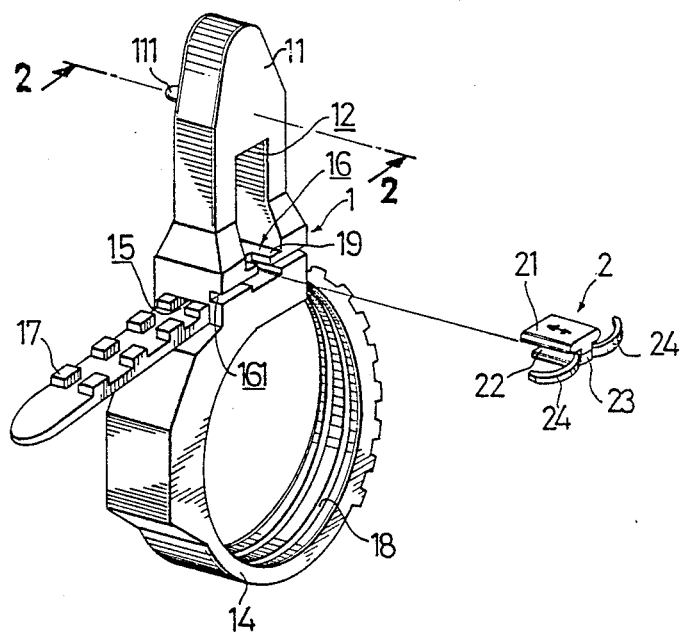
FIG. 1 is a perspective view of an adjustable securement ring in accordance with the present invention.

With reference to the drawings and particularly to FIG. 1 thereof, it can be seen that an adjustable securement ring in accordance with the present invention comprises a securing element 1 and a retarding means 2 made of plastic material. The present invention relates to such a securement ring that the retarding means 2 inserts into the securing element 1 to keep the securing element 1 in a ring shape after the securing element 1 has encompassed a tube.

The securing element 1 has a retaining body 11 comprising a cone-shaped protrusion 111 for sustaining one distal end of a pump so as to secure the pump on a bicycle by a pair of the adjustable securement rings of this invention. A passage 12 are formed beneath the protrusion 111 to facilitate the assembly of the retarding means 2; that is, the hollow inside of the passage 12 is large enough to permit the user to assemble and/or disassemble the retarding means 2 therein. An elongate strip 14 protrudes from the bottom end of the retaining body 11 and makes a loop so as to go back through a channel 15 provided on the lower portion, proximate to the passage 12, of the retaining body 11. A wall 19 positioned between the passage 12 and the channel 15 is receded to form a recess 16 in order to receive the retarding means 2, which will be described hereinafter for disclosing the combination of the securing element 1 and the retarding means 2.

A plurality of spaced protuberances 17 are integrally provided on the outer surface of the strap portion of the elongate strip 14 along its length. As can be seen in FIG. 1, it is preferably embodied that the protuberances 17 are arranged in two rows respectively by the sides of the elongate strip 14. Moreover, a plurality, here three, of grooves 18 are provided on the inner surface of the elongate strip 14 along its length in order to prevent the shift of the securing element 1 on the tube.

The retarding means 2 has two substantially rectangular plates 21, 22 which are parallel to each other and are laterally connected by a connector 23. A pair of wing-like elements 24 are laterally provided on the connector 23 to keep the retarding means 2 to horizontally reciprocate along the passage 12, when the retarding means 2 lodges in the recess 16 with the wing-like elements 24 housed in slots 161 which are proximate to the recess 16.

Figure 2:
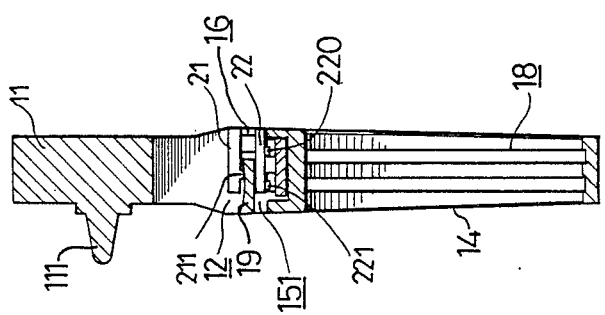
FIG. 2 is a cross-sectional view of the adjustable securement ring taken along line 2—2 of FIG. 1.

Referring to FIG. 2, the engagement of the securing element 1 and the retarding means 2 is in a manner that the upper and lower plates 21, 22 clamp the wall 19 which has a concave upper surface to form a mortise 191. A tenon 210 and a pair of lugs 220, 221 are respectively provided on the lower sides of the upper and lower plates 21, 22; the former is engaged with the mortise 191 to prevent the escape of the retarding means 2 from the securing element 1, and the latter is set against a pair of the protuberances 17 to retard the movement of the strap portion of the elongate strip 14 in order to determine the dimensions of the ring formed by the elongate strip 14. It should be noted that the retarding means 2 is horizontally slidable in the recess 16 since an opening 151 is formed corresponding to the lower plate 22 and receives the lower plate 22 when the connector 23 is urged to be flush with the wall 19. This results in the strap portion of the elongate strip 14 being adjustable in the channel 15 while the lugs 220, 221 are not in position to retain the protuberances 17.

Figure 3:
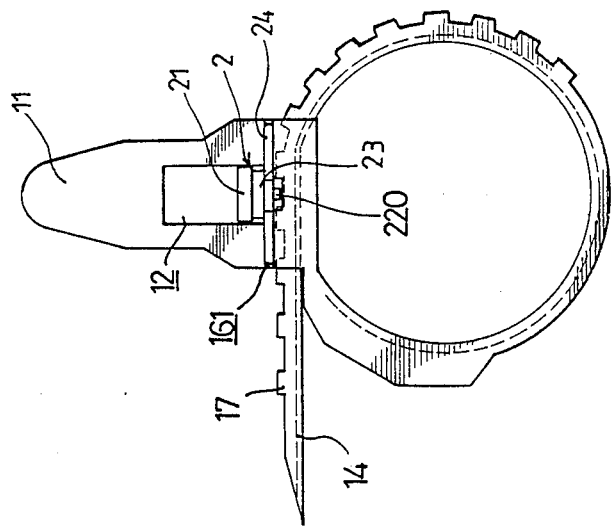
FIG. 3 is a side view of the adjustable securement ring of FIG. 1.
Figure 4:
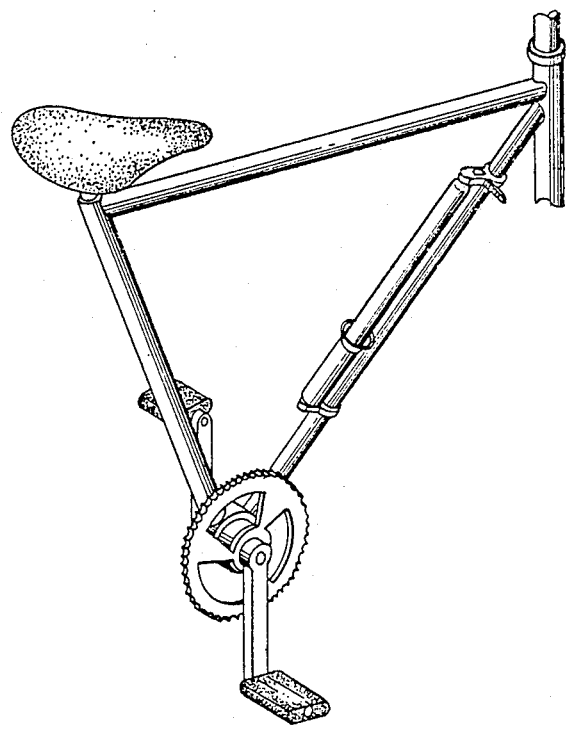
FIG. 4 is a perspective view embodying the adjustable securement rings mounted on a bicycle.
Figure 5:
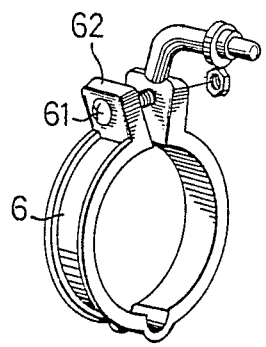
FIG. 5 is a perspective view of a conventional securement element.

Accordingly, the dimensions of the ring formed by this application are adjustable without disassembling the retarding means 2 from the securing element 1. Referring to FIG. 3, the combination of the invention from another aspect can be seen, wherein part of the protuberances 17 positioned in the channel 15 are indicated in dotted lines. Further referring to FIG. 4, it can be seen that a pair of such adjustable securement rings are employed to secure a bicycle pump on a bicycle.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. An adjustable securement ring for securing a bicycle pump on a bicycle comprising a securing element (1) and a retarding means (2), wherein:

said securing element (1) has a retaining body (11) comprising a cone-shaped protrusion (111) for sustaining a distal end of said bicycle pump; a passage (12) is formed beneath said protrusion (111) to facilitate an assembly of said retarding means (2) thereon; an elongate strip (14) protrudes from a bottom end of said retaining body (11) and make a loop to go back through a channel (15) provided on a lower portion, proximate to said passage (12), of said retaining body (11); a wall (19) between said passage (12) and said channel (15) is receded to form a recess (16) to receive said retarding means (2); and a plurality of spaced protuberances (17) are provided on an outer surface of a strap portion of said elongate strip (14) along its length; and said retaining means (2) has upper and lower plates (21, 22) which are connected to each other by a connector (23); a pair of wing-like elements (24) are laterally provided on said connector (23) to keep said retarding means (2) to horizontally reciprocate along said passage (12) when said retarding means lodges in said recess (16) with said wing-like elements (24) housed in slots (161) proximate to said recess (16); a tenon (210) is provided on a lower side of said upper plate (21) to prevent an escape of said retarding means (2) from said securing element (1); and lugs (220, 221) are provided on a lower side of said lower plate (22) to retain said strap portion of said elongate strip (14).

2. An adjustable securement ring as set forth in claim 1, wherein a plurality of grooves (18) are provided on an inner surface of said elongate strip (14) along its length in order to prevent the shift of said securing element 1.

3. An adjustable securement ring as set forth in claim 1, wherein an opening (151) is formed corresponding to said lower plate (22) and receives lower plate (22) when said connector (23) is urged to be flush with said wall (19), so that said elongate strip (14) is adjustable in said channel (15) while said lugs (220, 221) are not in position to retain said protuberances (17).

* * * * *